United States Patent [19]

Roberts

[11] Patent Number: 5,222,742
[45] Date of Patent: Jun. 29, 1993

[54] SEAL ARRANGEMENT

[75] Inventor: Michael C. Roberts, Bristol, Great Britain

[73] Assignee: Rolls-Royce plc, London, England

[21] Appl. No.: 810,149

[22] Filed: Dec. 19, 1991

[30] Foreign Application Priority Data

Dec. 22, 1990 [GB] United Kingdom ............... 9027963

[51] Int. Cl.$^5$ ............................................ F16J 15/447
[52] U.S. Cl. ........................................ 277/3; 277/53; 415/174.5
[58] Field of Search ............... 277/3, 25, 29, 53, 56, 277/57, 70, 75; 415/171.1, 173.5, 174.5

[56] References Cited

U.S. PATENT DOCUMENTS 3,251,601  5/1966  Harvey .................................. 277/53
4,534,701  8/1985  Wisser ......................... 415/171.1 X
5,088,889  2/1992  Wolff .................................... 277/53

FOREIGN PATENT DOCUMENTS 646436  6/1937  Fed. Rep. of Germany ........ 277/56

Primary Examiner—William A. Cuchlinski, Jr.
Assistant Examiner—Scott W. Cummings
Attorney, Agent, or Firm—Oliff & Berridge

[57] ABSTRACT

An air seal is disposed between high and low pressure zones and includes an annular static arm and coaxial annular sealing arm which rotates relative to the static arm. The static arm, is scalloped to form a series of cavities and the sealing arm is formed with angled through holes opposite the cavities. A seal is provided between the static arm and the sealing arm. In use, a ram pressure rise is generated in the holes by the rotation of the sealing arm and the pressure rise creates a flow of air which offsets the leakage past the seal.

15 Claims, 4 Drawing Sheets

SEAL ARRANGEMENT

FIELD OF THE INVENTION

The present invention relates to seal arrangements and more particularly, but not exclusively, to air seals for gas turbine engines.

BACKGROUND OF THE INVENTION

Turbine entry gas pressures have risen continuously recently, and these rises affect the secondary or cooling air system. In particular, High Pressure (HP) turbine blades generally require 'showerhead' cooling, thereby necessitating the cooling air feed pressure to be greater than the turbine entry gas pressure. A consequence of these pressures is that a rudimentary air seal between HP nozzle guide vanes and the HP turbine vanes is no longer acceptable because the leakages around the seal are unacceptably high.

In addition to the high turbine entry temperatures and high disc speeds, there is a constant necessity to improve efficiency, for example, by increasing the thrust/weight ratio.

There is therefore a move towards omitting certain non-fundamental components such as coverplates. At the same time, however, non-useful leakages must be reduced because the secondary air available for cooling crucial components such as the flame tube, HP nozzle guide vanes and HP turbine blades will become reduced, for example, to achieve certain smoke levels.

SUMMARY OF THE INVENTION

According to the present invention there is provided a labyrinth seal arrangement for use between zones of high and low pressure. The seal comprises an annular static member and a coaxial annular sealing ring which rotates relative to the static member. The members are radially spaced to provide running clearance during rotation which defines an annular leakage passage between the high and low pressure zones. The sealing ring is formed with a plurality of through channels which form a communication from the low pressure zone to the high pressure zone. These channels are inclined circumferentially in the direction of rotation of the ring whereby a ram pressure rise is generated in a channel in the region of its opening to the low pressure zone to drive flow through the channel from the low pressure zone to the high pressure zone.

In preferred arrangements the static member and the sealing ring face each other, one radially outward of the other, and the annular surface of the static member facing the openings in the sealing ring is scalloped to form a series of cavities separated by fences. More preferably, the static member is disposed radially outward of the sealing ring.

Conveniently each cavity extends in a generally axial direction, or each cavity extends in a generally helical path. Preferably the channels are in the form of through holes and the holes are angled relative to a radial plane at least in the region of the opening to the low pressure zone, and the holes face in the direction of rotation in use.

In further preferred arrangements the center lines of the holes are straight and are disposed in a common axial plane, and the angle of inclination of each center line is in the range 10° to 20° to the tangent. It has been found that 15° is particularly suitable.

In another arrangement the channels are constituted by the spaces between a series of vanes angled relative to a radial plane at least in the region of the opening to the low pressure zone of the channels so that said channels face in the direction of rotation in use. Preferably the pressure rise is in the range 5 to 20%, and 12% has been found to be satisfactory. Also, it is preferable if the angular spacing between the channels is substantially equal.

BRIEF DESCRIPTION OF THE DRAWINGS

Embodiments of the invention will now be described in more detail by way of example. The description makes reference to the following drawings in which.

DESCRIPTION OF THE PREFERRED EMBODIMENT

Figure 1:
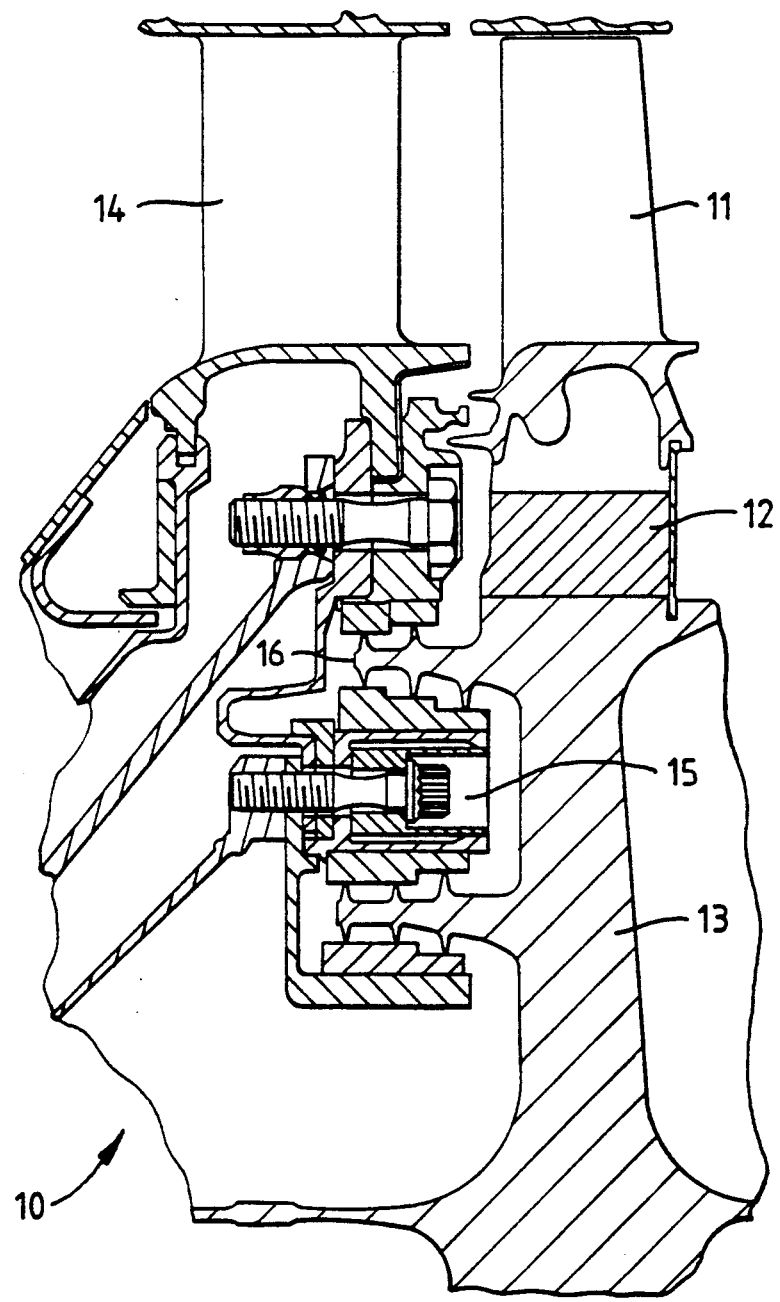
FIG. 1 is a view through a known turbine stage.

FIG. 1 shows one stage 10 of a known turbine arrangement. The stage comprises turbine blades 11 having roots 12 by which a number of the blades 11 are connected about the periphery of a turbine disc 13. The turbine disc 13 and the blades 11 are mounted for rotation relative to a number of stationary nozzle guide vanes 14. The turbine gas stream flows through the nozzle guide vanes 14 then through the turbine blades 11 and cooling air passes through pre-swirl nozzles 15 then through porting which enable access to the insides of the turbine blades 11. The two gas flows are separated by a labyrinth seal 16.

The pre-swirl nozzles 15 at a high radius from the turbine center line reduce the temperature of the cooling air and, although the leakage through the labyrinth seal 16 is quite high, the performance of the arrangement is rendered satisfactory because less cooling air is required for blade cooling, because of its initial low temperature.

Figure 2:
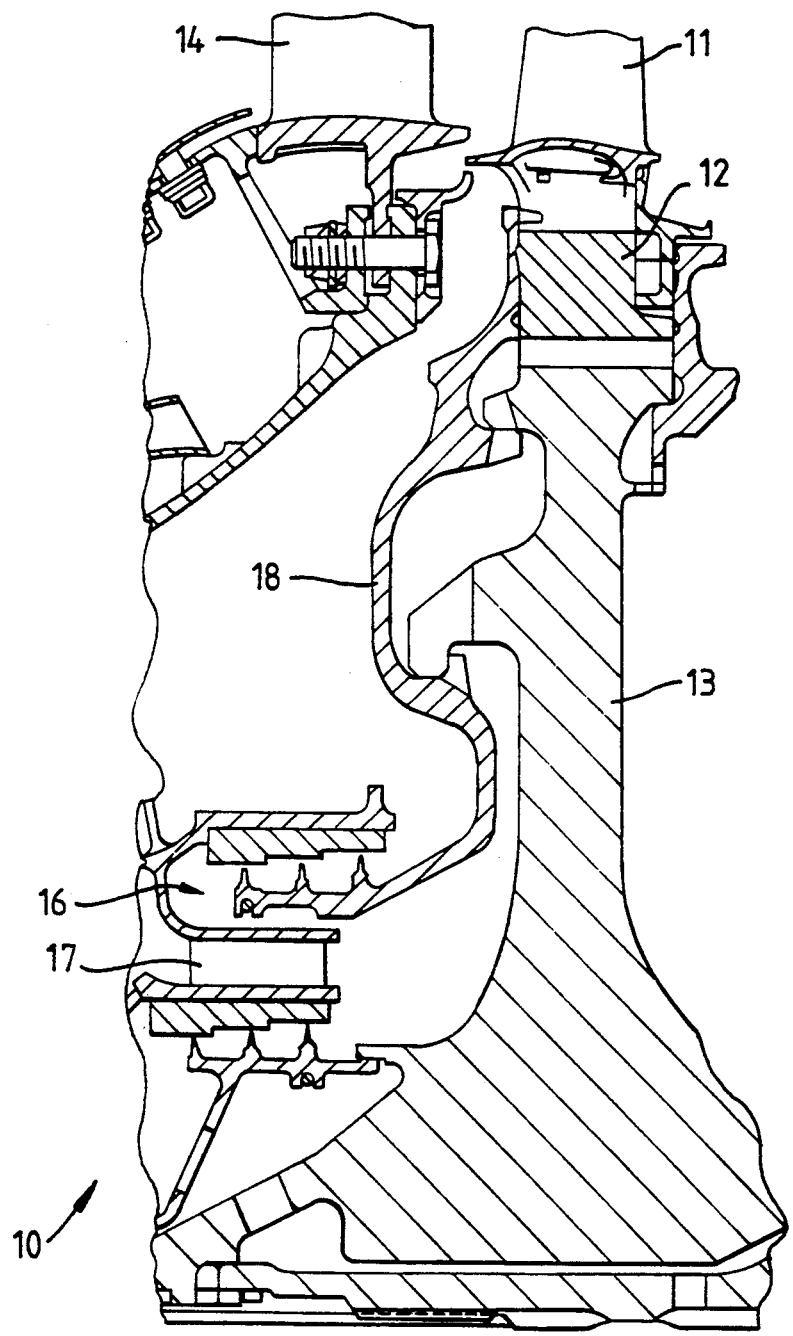
FIG. 2 is a view through another known turbine stage.

In FIG. 2 there is shown one stage 10 of another known turbine arrangement. Parts which have direct equivalents in FIG. 1 are shown with like reference numerals. In this arrangement, cooling air enters through inlet 17 at a low radius from the turbine center line. A coverplate 18 is connected to the turbine disc 13 and the two air flows are separated by a labyrinth seal 16. Because the seal is at a low radius where the leakage circumference, tolerances, thermal growths and deflections are less, leakage is relatively low, thereby counteracting the relatively higher cooling air temperature due to the exclusion of pre-swirl nozzles.

These two known types of arrangement are not ideal and are unable to satisfactorily cope with modern day turbine entry temperatures and disc speeds. In addition, there is a constant need to increase the thrust/weight ratios, preferably beyond 10/1 and towards 20/1.

Figure 3:
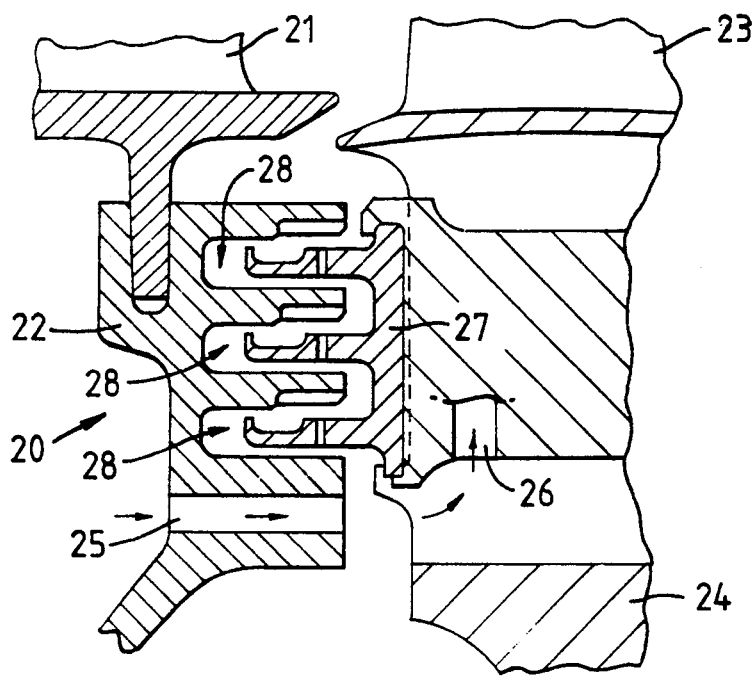
FIG. 3 shows a detail of a turbine stage incorporating the present invention.
Figure 4:
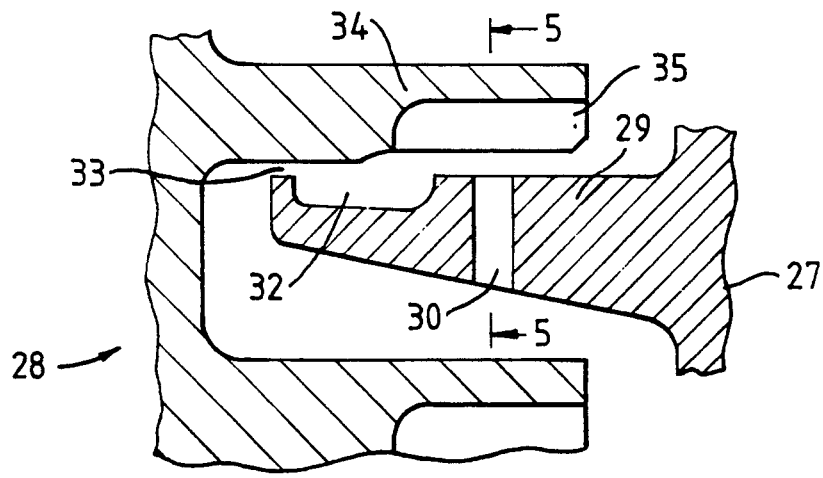
FIG. 4 is a more detailed view of a seal shown in FIG. 3.
Figure 5:
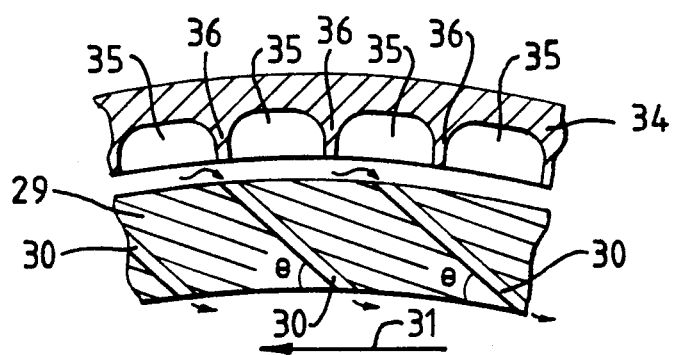
FIG. 5 is a sectional view taken on line 5—5 of FIG. 4.

FIGS. 3 to 5 show a labyrinth fin seal incorporating a reverse-flow air seal arrangement 20 for sealing between the HP nozzle guide vanes 21 and HP turbine blades 23 which are connected to the turbine disc 24 by known methods. Pre-swirl nozzles 25 are provided in the static member 22 which, in the stage shown, is part of the CCIC cone. The pre-swirl nozzles 25 lower the temperature of the cooling air which passes through them. The cooling air is then able to pass through ports 26 which communicate with the insides of the turbine blades.

The cooling air is at a higher pressure than the turbine gas stream and they are sealed from each other by a series of annular reverse-flow air seals 28. In this example, three such seals 28 are shown in series, but it will of course be appreciated that, depending on the conditions of operation, one, two or indeed any number of the seals 28 could be provided. In this embodiment, an annular sealing ring is coaxially attached to the turbine disc 24 and is provided with three annular, axially extending seal arms 29 disposed radially outward of the pre-swirl nozzles 25.

Only the action of one reverse-flow air seal 28 need be discussed. The arm 29 is provided with a number of oblique through channels or holes 30 which are spaced around the circumference of the arm 29. The center lines of all the holes in this case lie on a single axial plane and are inclined at an angle θ to the tangent.

The arm 29 is designed for rotation in the direction of arrow 31. The static member 22 is provided with an annular static arm 34 which, at its free end, is scalloped so as to provide a continuous series of spoiler cavities 35 separated by fences 36 radially opposite the holes 30 in the arm 29. These cavities 35 may be formed by electrical discharge machining. Between the holes 30 and the free end of the arm 29 is an annular recess 32 which faces radially outwards. A seal 33 is provided between the arm 29 and the static member 22.

In operation, the holes 30 face into the direction of rotation so that a 'ram' pressure rise occurs at the entrances of the holes 30 facing the cavities 35. At high speeds of revolution, this ram pressure rise can be in the range 5 to 20% but is preferably around 12%. There will of course be leakage around the seal 33, which in this example is shown as a labyrinth seal, and if this pressure drop across the seal 33 is less than the ram pressure rise, then air will tend to reverse-flow inwards through the holes to offset the leakage around the seal 33.

The magnitude of this inward flow depends on a number of parameters, for example, hole area, angle of inclination, coefficient of discharge, rotor arm thickness and static pressure inboard of the holes 30. Also, the openings of the holes can also be customized so as to increase the ram pressure rise.

It has been found that an angle θ in the range 10° to 20° is suitable but around 15° will produce a ram pressure rise of about 12% at modern turbine speeds. It is also clear that the hole length/hole diameter ratio is preferably large so as to increase the coefficient of discharge and to avoid 3-dimensional flow effects as far as possible. There is also a small pressure drop through the holes due to change in radius.

As stated, the static arm 34 aft of the seal 33 is formed with spoiler cavities 35. The fences 36 formed between the cavities 35 act so as to destroy or considerably reduce whirl (tangential) velocities caused by windage. In practice, the cavities provide relatively static pockets of air upon which the rotating angled holes 30 can act so as to create the ram pressure rise in the holes. It is best but not essential that the number of fences should be relatively prime to the number of holes to avoid excitation high energies. It is however possible to create a ram pressure rise without the cavities but not as efficiently. Also the annular recess 32 in the arm 29 improves the condition of the air in the cavities 35, thus facilitating the production of the ram pressure rise.

Alternative arrangements are of course possible, for example, the center lines of some holes may be on a different axial plane or planes to other holes, the centre lines of the holes may be offset relative to an axial plane, some holes may be of a different size to the others and/or at different angles. The holes may be replaced by channels formed by miniature compressor vanes.

Figure 6:
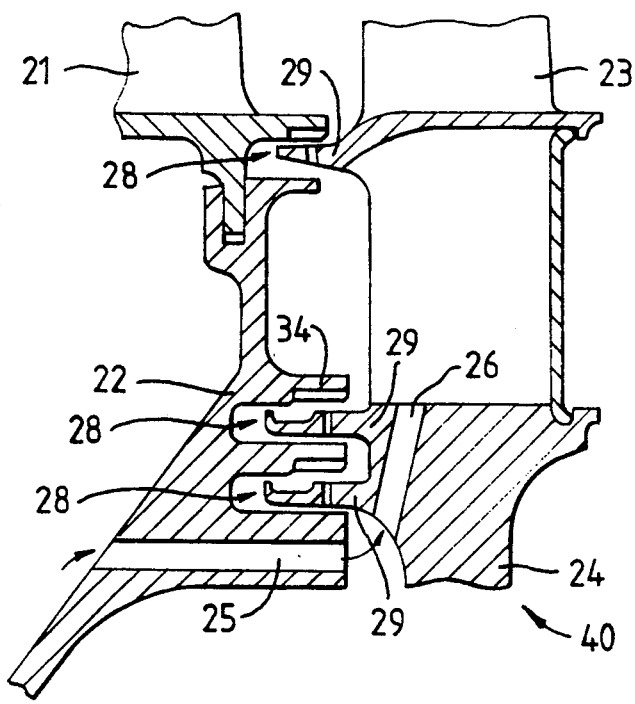
FIG. 6 shows a detail of a turbine stage incorporating a second embodiment of the present invention.

A second embodiment of the invention is shown in FIG. 6 and again like parts have been given like reference numerals. In this sealing arrangement 40 there are provided annular seal arms 29 integral with the rotor disc 24 which therefore dispenses with the separate annular seal ring 27. It will also be noted that the cooling air inlet 26 is drilled through the rotor disc 24.

Figure 7:
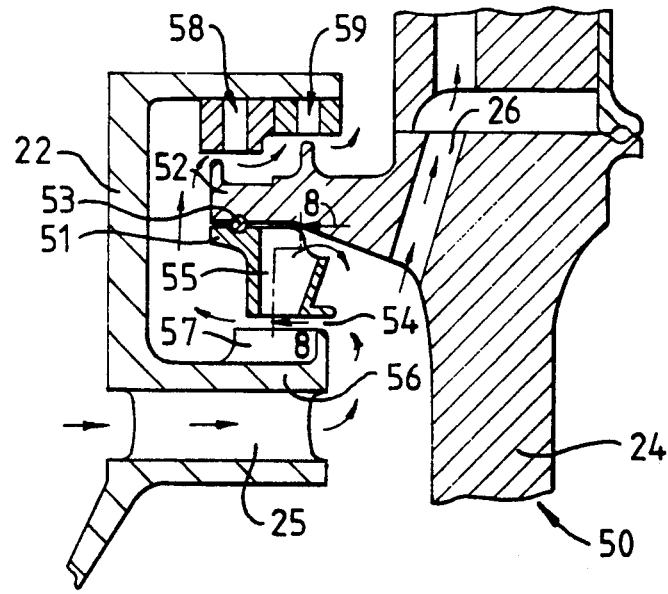
FIG. 7 shows a detail of a turbine stage incorporating a third embodiment of the present invention.
Figure 8:
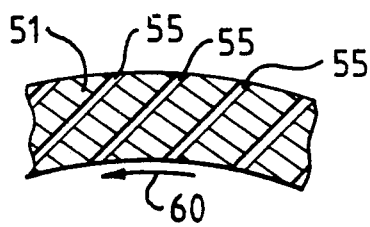
FIG. 8 is a sectional view taken on line 8—8 of FIG. 7.

A third embodiment is shown in FIGS. 7 and 8 and again, like parts have been given like reference numerals. The seal arrangement 50 comprises an annular seal ring 51 which is attached to an annular rotor arm 52 by a retaining member 53. The ring 51 has a number of angled holes 55 spaced around its angular extent, and these holes diffuse outwardly and face into the direction of rotation 60 at the inner surface of the ring 51. Radially inward of the ring 51 is a static arm 56 which is scalloped opposite the holes 55 to form spoiler cavities 57 which act in a similar manner to those in the earlier described embodiments. A seal 54 is also provided between the static arm 56 and the ring 51. This seal 54 is equivalent to the seal 33 in the first embodiment. This embodiment is in many respects an inversion of the first embodiment, but the diffused nature of the holes 55 acts as a cooling fluid impeller which reduces leakage past the first seal 54. Second and third seals 58 and 59 are also provided and in this example are in the form of honeycomb labyrinth seals.

In the applications mentioned, the device reduces rim leakages or eliminates or even reverses them by suitable choice of variables. The seal could also be used in a number of other areas of an engine. The principle could also be inverted to provide outward flow of fluid. The seal arrangements described can be applied to any suitable situation and are not limited to turbines or other engines.

I claim:

1. A labyrinth seal arrangement for use between zones of high and low pressure comprising:
    an annular static member,
    a coaxial annular sealing ring which rotates relative to the static member, the members being radially spaced to provide running clearance during rotation which defines an annular leakage passage between the high and low pressure zones,
    said sealing ring being formed with a plurality of through channels which provide communication from the low pressure zone to the high pressure zone,
    the channels being inclined circumferentially in the direction of rotation of the ring whereby a ram pressure rise is generated in a channel in the region of its opening to the low pressure zone to drive flow through the channel from the low pressure zone to the high pressure zone.

2. An arrangement as claimed in claim 1 wherein the pressure drop across the seal is less than or equal to said ram pressure rise.

3. An arrangement as claimed in claim 1 wherein the static member and the sealing ring face each other, one radially outward of the other.

4. An arrangement as claimed in claim 3 wherein the annular surface of the static member facing the openings in the sealing ring is scalloped to form a series of cavities separated by fences.

5. An arrangement as claimed in claim 4 wherein the static member is disposed radially outward of the sealing ring.

6. An arrangement as claimed in claim 4 wherein each cavity extends in a generally axial direction.

7. An arrangement as claimed in claim 1 wherein the channels are in the form of through holes.

8. An arrangement as claimed in claim 7 wherein the holes are angled relative to a radial plane at least in the region of the opening to the low pressure zone and the holes face in the direction of rotation in use.

9. An arrangement as claimed in claim 8 wherein the center lines of the holes are straight and are disposed in a common axial plane.

10. An arrangement as claimed in claim 9 wherein the angle of inclination of each center line is in the range 10° to 20° to the tangent.

11. An arrangement as claimed in claim 10 wherein said angle is about 15°.

12. An arrangement as claimed in claim 1 wherein said pressure rise is in the range 5 to 20%.

13. An arrangement as claimed in claim 12 wherein said pressure rise is around 12%.

14. An arrangement as claimed in claim 1 wherein the angular spacing between the channels is substantially equal.

15. An arrangement as claimed in claim 1, wherein the channels are spaced apart around the sealing ring.

* * * * *